United States Patent
Parng et al.

(10) Patent No.: US 7,713,485 B2
(45) Date of Patent: May 11, 2010

(54) MICROFLUIDICS SWITCH WITH MOVING PLANES

(75) Inventors: Shaw-Hwa Parng, Kaohsiung (TW); Mei-Ya Wang, Tainan (TW); Hung-Jen Yang, Hsin-Chu (TW)

(73) Assignee: Industrial Technology Research Institute, Hsin-Chu (TW)

( * ) Notice: Subject to any disclaimer, the term of this patent is extended or adjusted under 35 U.S.C. 154(b) by 1398 days.

(21) Appl. No.: 10/390,669

(22) Filed: Mar. 19, 2003

(65) Prior Publication Data

US 2004/0184967 A1    Sep. 23, 2004

(51) Int. Cl.
    *B01L 3/00*    (2006.01)
(52) U.S. Cl. .................. 422/102; 422/100; 422/103
(58) Field of Classification Search ............. 422/68.1, 422/99, 100, 102, 103
    See application file for complete search history.

(56) References Cited

U.S. PATENT DOCUMENTS

| | | | |
|---|---|---|---|
| 5,677,195 A * | 10/1997 | Winkler et al. ............ 436/518 |
| 5,997,708 A * | 12/1999 | Craig ........................ 204/601 |
| 6,154,226 A * | 11/2000 | York et al. ................ 346/140.1 |
| 6,167,910 B1 * | 1/2001 | Chow ........................ 137/827 |
| 6,251,343 B1 * | 6/2001 | Dubrow et al. ............ 422/102 |
| 6,444,106 B1 * | 9/2002 | Mcbride et al. ............ 204/450 |
| 6,485,690 B1 * | 11/2002 | Pfost et al. ................ 422/102 |
| 6,607,644 B1 * | 8/2003 | Apffel, Jr. ................ 204/451 |
| 6,766,817 B2 | 7/2004 | da Silva |
| 6,845,968 B2 * | 1/2005 | Killeen et al. ............ 251/304 |
| 6,916,113 B2 * | 7/2005 | Van de Goor et al. ...... 366/108 |
| 7,128,876 B2 * | 10/2006 | Yin et al. ................... 422/100 |

\* cited by examiner

*Primary Examiner*—Jill Warden
*Assistant Examiner*—Dwayne K Handy

(57) ABSTRACT

A microfluidics switch with moving planes has a first substrate with some holes and a second substrate with some micro-channels. Herein, the relative planes of both substrates are covered by a hydrophobic material. Therefore, while the substrates are neighboring and relatively moving, the overlap relation between the holes and the micro-channels are varied and a switch function is provided. Further, by using the hydrophobic material, while the distance between substrates is smaller than the height of drop of each liquid inputted into the holes, the fluids can not fluid between the planes and then different micro-channels are isolated from each other.

9 Claims, 7 Drawing Sheets

| Contact angle | PMMA-RPMI 1640 | PMMA-Deionized Water | Teflon-RPMI 1640 | Teflon-Deionized Water |
|---|---|---|---|---|
| 1 | 44 | 85 | 110 | 117 |
| 2 | 43 | 80 | 115 | 113 |
| 3 | 61 | 82 | 108 | 110 |
| 4 | 66 | 64 | 111 | 111 |
| Average | 53.5 | 77.75 | 111 | 112.75 |

MICROFLUIDICS SWITCH WITH MOVING PLANES

BACKGROUND OF THE INVENTION

1. Field of the Invention

The present invention relates to a micro-fluids switch with moving planes, especially relates to a mixed apparatus of passively mechanical design and hydrophobic property between fluids and micro-channels. Moreover, the goal of changing fluid channels can be achieved by means of simply relative motion between substrates.

2. Description of the Prior Art

Many contemporary products and processes have to be designed to let fluids flow in micro-channels. For example, in the field of molecular biology, biochemical experiments are always taken with biochips with micro-fabricated flow channels. Further, in the field of electronic products, an ink-jet head of a thermal ink-jet printer has many micro-fabricated flow channels to let ejecting ink be normally distributed. Obviously, it is an important issue about how to moderately control the fluid flowing in these micro-channels (especially about the switch of different fluids). Herein the so-called micro-channel is a fluid channel with a very small dimension (very small cross-section). For example, a diameter of a cross-section of a micro-channel usually is between 0.1 microns and 1000 microns.

Take bio-chip for example (as shown in FIG. 1A), the basic structure consists of a hollow hole 11 made on a substrate 10 for biochemical reaction, independently-input micro-fabricated flow channels 12 made on the substrate 10 and connected with the hollow hole 11, and an independently-output micro-fabricated flow channel 13 connected with the hollow hole 11 but disconnected with these independently-input micro-fabricated flow channels 12. In the practical application, different independently-input micro-fabricated flow channels 12 are used to separately transmit different fluids (such as different bio-developed fluids) to the hollow hole 11 and the independently-output micro-fabricated flow channel 13 is used to transmit the unnecessary fluids out from the hollow hole 11. Besides, because there are special needs in the bio-chemical experiments, these conditions of the fluid switch controlling in different state with different fluids passing through independently-input micro-fabricated flow channels must be satisfied as follows: (1) Different fluids in different independently-input micro-fabricated flow channels 12 cannot be mixed before arriving at the hollow hole 11. (2) The environmental changes (such as pressure change) of the hollow hole 11 caused by switching micro-fabricated flow channels should be diminished as less as possible. (3) The switch apparatus has to be easily-operated, stable, and repeatedly-used during long periods. (4) The switch process should not produce materials (such as materials, which will depress biochemical reaction) which will affect the environment in the hollow hole 11. (5) The switching apparatus must be separable. Besides, if we neglect the hollow hole 11 and only consider the one-to-many relationship between the independently-output micro-fabricated flow channel 13 and the independently-input micro-fabricated flow channels, the structure (and corresponding microfluidics switch) as is shown in FIG. 1A can also be applied to a ink-jet head used in a thermal ink-jet printer and so on.

In the prior technology, microfluidics switch can be divided into active and passive categories. As is shown in FIG. 1B, an active microfluidics switch is designed to let each independently-input micro-fabricated flow channels 12 connect different fluid sources 16 through different input tubes 14 and different switches 15, and let the independently-output micro-fabricated flow channel 13 connect outside through output tube 17. Therefore, fluids (output fluids though controlled output tube 17) entering the hollow hole 11 and participating biochemical reactions can be controlled by virtue of adjusting each on-off state of switches 15. Generally speaking, however, an active microfluidics switch always has some faults as follows: (1) produce it expensively. (2) Switching will have a great impact on the state of the hollow hole (instant change is more obvious). (3) Components passed by fluids will be contaminated and should be disposable. (4) The instant response of switching cannot show because of the long distance between the switch and the hollow hole.

As is shown is FIG. 1C, a passive microfluidics switch consists of an upside substrate and a downside substrate and the two substrates 10 are closely connected, and a hollow hole 18 is formed in the interface between the two planes 10. Besides, the hollow hole 18 used to input/output fluids with outside, micro-fabricated flow channels 19, and inter-medium 195 are formed separately between the two substrates. The flows of fluids in the micro-fabricated flow channels can be controlled by means of using inter-medium 195 to change flow direction of fluids, and the input/output fluids in the hollow hole 18 can be further controlled. Generally speaking, however, a passive microfluidics switch always has some faults as follows: (1) The matching design between the inter-medium and the micro-fabricated flow channels is so complicated that the inter-medium and the micro-fabricated flow channels cannot be fonned precisely. (2) The inter-medium always reacts with the fluids and then the reaction produces impurities (they will contaminate the hollow hole used as a reaction chamber and final output fluids), (3) The inter-medium always cannot react instantly with the effect of the flow direction change of fluids. (4) The process of connecting upside substrate and downside substrate always damages the micro-fabricated flow channels and the inter-medium.

Therefore, the known technology of switch apparatuses of fluids clearly has several problems needed to be improved. Hence, how to form good microfluidics switch when applying the technology or the product of "Let fluids flow in the micro-channels" is still an urgent problem to be solved.

SUMMARY OF THE INVENTION

One main purpose of the invention is to provide a microfluidics switch, especially an apparatus that is stable and easily-operated.

Another main purpose of the invention is to provide a microfluidics switch, especially an apparatus that combines the definitely-switched merit of an active microfluidics switch and the easily-programmed merit of a passive microfluidics switch.

The other main purpose of the invention is to provide a microfluidics switch for improving several unavoidable faults of prior technology by virtue of using hydrophobic materials and allowing the relative motion between a upside substrate and a downside substrate.

The microfluidics switch with moving planes provided by the invention basically has a first substrate with many micro-holes and a second substrate with many micro-fabricated channels. Moreover, the relative planes of both substrates are covered by hydrophobic materials. Therefore, while the substrates are neighboring and moving relatively, the fluid channels formed by overlapping micro-holes and micro-fabricated channels can be controlled, and which fluids from different micro-holes can pass through the micro-fabricated channels can further be controlled. Further, by using the hydrophobic material, while the distance between substrates is smaller than the height of drop of each liquid inputted into the holes, the fluids cannot fluid through the gap between the neighboring substrates and then different micro-channels are isolated from each other.

As compared with the prior technology, the invention comprises several main features as follows:

(1) Forming fluid channels by means of moving two substrates relatively to switch those micro-holes and micro-fabricated channels without switches and inter-medium. Therefore, the microfluidics switch with moving planes can be switched definitely like an active microfluidics switch, and it also can be used as a passive microfluidics switch without any switches and so on except the two substrates.

(2) Avoiding fluids flowing between the two substrates by virtue of the hydrophobic materials covered on the relative planes of the two substrates. Therefore, the two substrates can be connected without closing precisely just as a passive microfluidics switch needs to be closed precisely without any gap), and then the possible danger of breaking micro-holes and micro-channels when closing two substrates precisely can be avoided just as the deformation of the micro-channel because of too great pressure put on the substrates).

(3) Forming different combinations of fluid channels by virtue of adjusting moderately the distribution of micro-holes and micro-channels (i.e. different fluid combinations). Therefore, the programmable function can be provided by means of moving the two substrates relatively to control the mutual communications between those micro-holes and those micro-channels without adjusting the distribution of inter-medium and micro-channels to provide direction-changed and locked functions as a passive microfluidics switch do.

(4) Without using inter-medium or switches and so on. Therefore, the possibility of the contamination of fluids drops significantly, while the components needed to be disposed because of contamination will also be reduced dramatically especially when the materials of the substrates and the hydrophobic material are low chemical activity materials such as acrylic material or Teflon and so on.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1A:
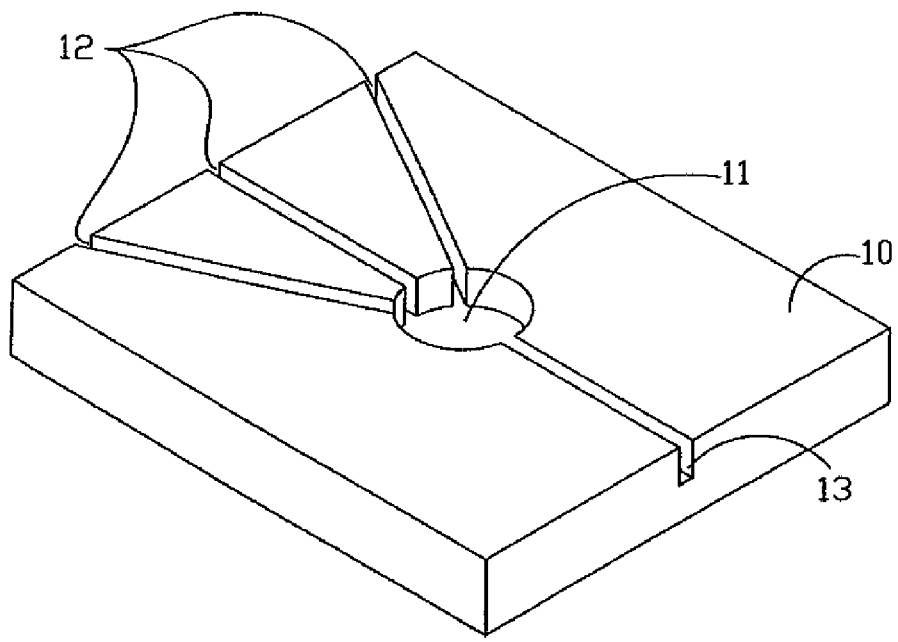
FIG. 1A to FIG. 1C are the schematics of the fundamental constitution of the well-known bio-chip and microfluidics switch.
Figure 1B:
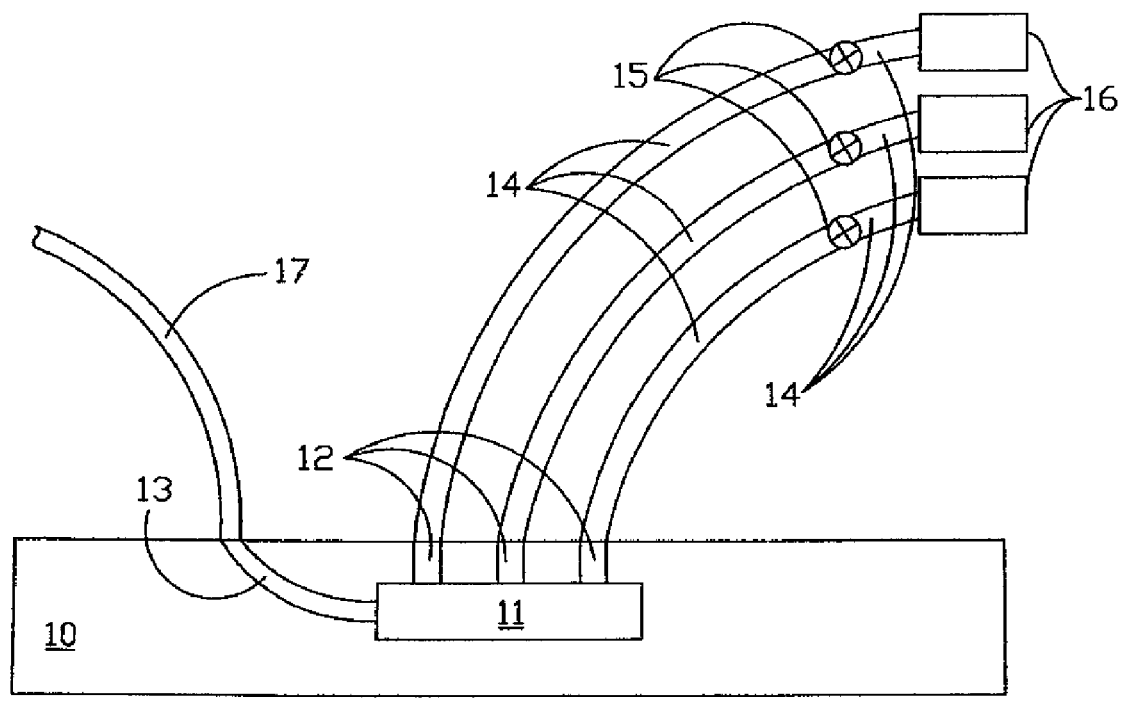
Figure 1C:
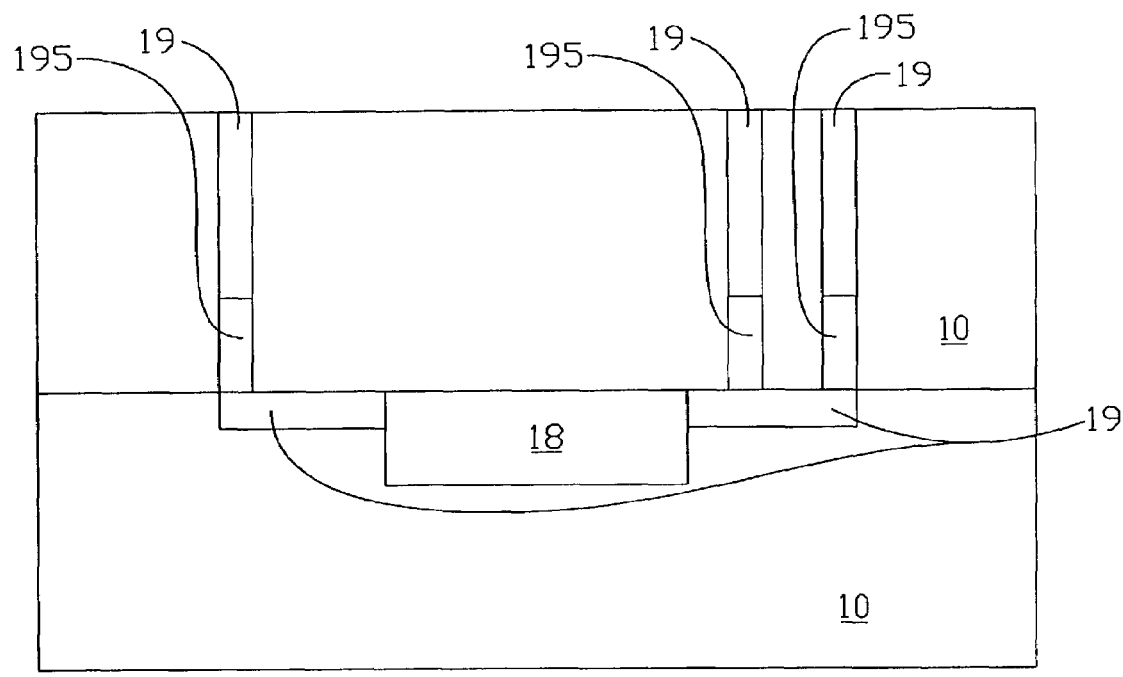

Some embodiments of the invention will be described exquisitely as below. Besides, the invention can also be practiced extensively in other embodiments. That is to say, the scope of the invention should not be restricted by the proposed embodiments. The scope of the invention should be based on the claims proposed later.

Initially, the inventors of the invention emphasize that the prior technology only takes substrates as the background which fluid channels located and as a reaction chamber and controls the input and the output of fluids by switches and inter-medium etc. Besides, two substrates are often formed separately and combined together to form the whole bio-chip (microfluidics switch) by virtue of the need of the convenience of manufacturing. Focusing on this point, the inventors of the invention propose another idea for solving this problem: since the fluid channels are formed by micro-holes and micro-channels located separately on two substrates, the relative position of the two substrates will decide whether the micro-holes can connect with micro-channels to communicate. Therefore, the inventors of the invention propose a new solution: By virtue of using the relative motion between two substrates, the communication between those micro-holes and those micro-fabricated channels can be controlled, and then the input and output of fluids can be controlled without using switches and inter-medium etc.

Sequentially, the inventors of the invention emphasize that prior art is designed for avoiding different fluids being mixed and for avoiding each fluid being contaminated with other fluids. Hence, two substrates are connected closely enough to avoid fluids flowing through the gap between substrates. Herein, substrates can limit the fluids within the micro-fabricated channels located in the substrate. Focusing on this point, the inventors of the invention propose another idea for solving the problem: While the fluids flow in micro-fabricated channels, the flow of fluids will always be affected by the surface properties of these micro-fabricated channels and then some phenomena (such as the capillary phenomenon) which will not happen in big size channels will be important. Therefore, the inventors of the invention propose a solution: Using the specialty of the different drop shapes formed between different fluids and materials (or different contact angles) especially. Thus, when the distance between the two substrates (or the distance between two hydrophobic materials) is smaller than the height of any drop formed by input fluids on the hydrophobic material which covers the corresponding planes of the two substrates, fluids can be effectively avoided flowing between the two substrates without connecting closely the two substrates enough to let the fluids unable to flow through. Therefore, not only the unavoidable faults caused by closely connecting substrates of the prior art can be avoided, but also the relative motion between the two substrates can be allowed (because the two substrates are not closely connected, relative slide and relative rotation can happen). Hence, the switch means can be controlled by virtue of using the said relative motion between the two substrates.

Figure 2A:
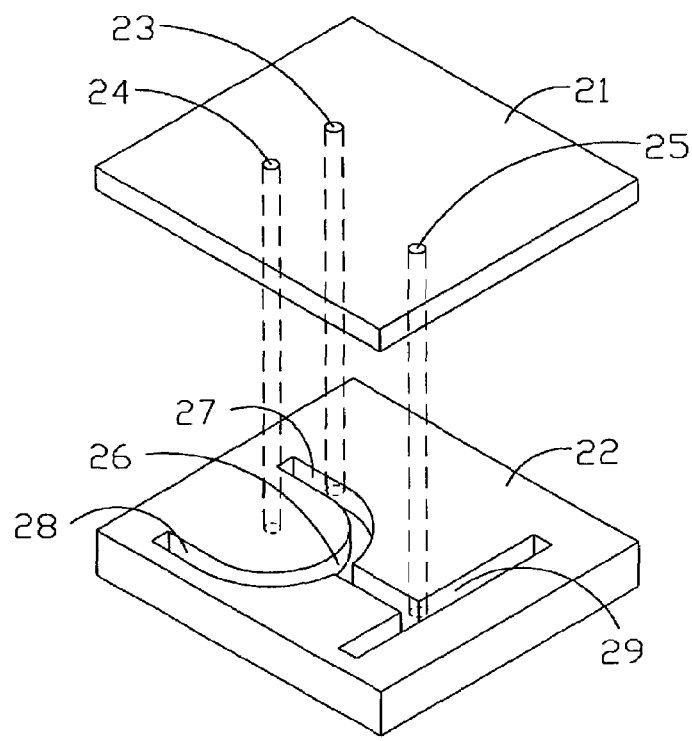
FIG. 2A to FIG. 2F are the schematics of the fundamental constitution of one kind of microfluidics switch with moving planes of the invention, experimental data, and corresponding changes of the embodiment.
Figure 2B:
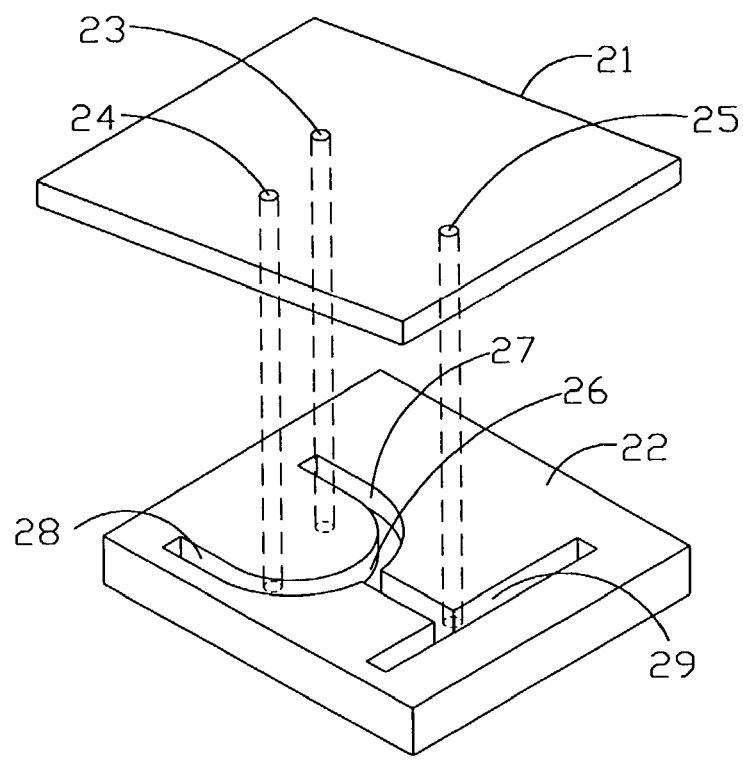
Figure 2C:
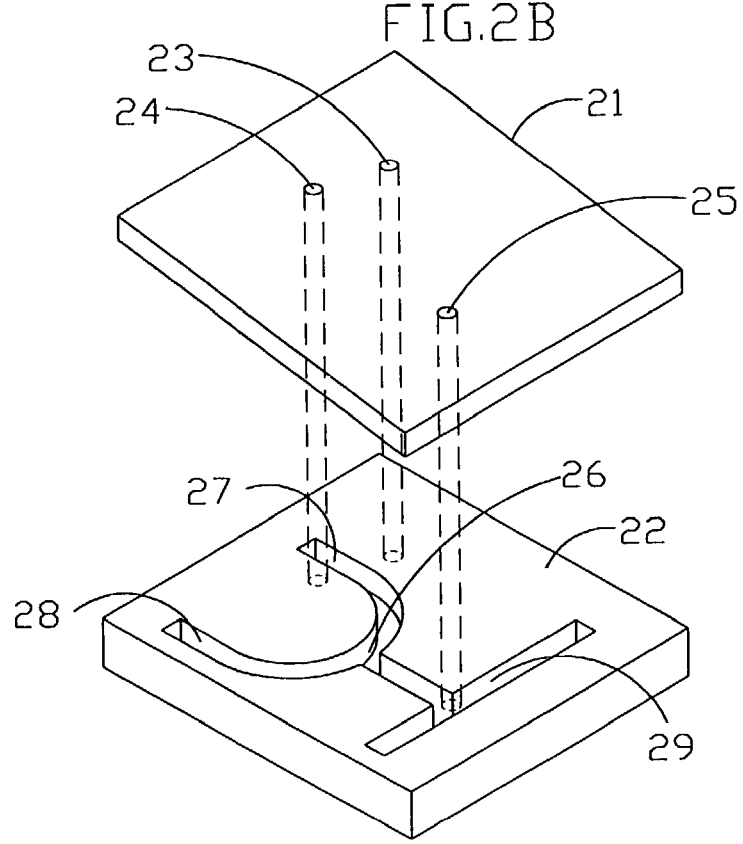

On the basis of the discussion above, one preferred embodiment of the invention is a microfluidics switch with moving planes. As is shown in FIG. 2A to FIG. 2C, the embodiment comprises: a first substrate 21 and a second substrate 22. Herein, the distance between the two substrates is exaggeratedly drawn to illustrate substrates easily, but the distance between the two substrates in reality is very small. The details about connecting fluid pipes from outside to each substrate 21/22 and about fixing each substrate can be applied by prior art and they are not detailed here.

The first substrate 21 has a first plane covered by hydrophobic materials, and there are three independent holes: a first hole 23, a second hole 24, and a third hole 25 on the first plane. The second substrate 22 has a second plane covered by hydrophobic materials and facing the first plane, and there is a pit 26 (taken as biochemical reaction chamber) connected with a first microfluidics channel 27, a second microfluidics channel 28, and a third microfluidics channel 29 on the second plane.

Herein, the distribution and shapes of the first hole 23, the second hole 24, the third hole 25, the first microfluidics channel 27, the second microfluidics channel 28, and the third microfluidics channel 29 must conform to constraints to form fully conducted channels in a microfluidics switch with moving planes as follows: While the first hole 23 overlaps the first microfluidics channel 27, the third hole 25 will also overlap the third microfluidics channel 29 (to form one fully conducted fluid channel); while the second hole 24 overlaps the second microfluidics channel 28, the third hole 25 will also overlap the third microfluidics channel 29 (to form another fully conducted fluid channel).

Obviously, by means of the design, the whole microfluidics switch with moving planes will only need to let the first substrate 21 move relatively to the second substrate 22 to easily switch among these three cases: (1) As shown in FIG. 2A only the first fluid passing through the first hole 23 can enter the pit (reaction chamber) 26. (2) As shown in FIG. 2B only the second fluid passing through the second hole 24 can enter the pit (reaction chamber) 26. (3) As shown in FIG. 2C no fluids can enter the pit (reaction chamber) 26. In other words, the fluid situations in the reaction chamber of the embodiment can be switched definitely and swiftly by virtue of the overlap of each hole 23/24 and each corresponding microfluidics channel 27/28. Herein, the first substrate 21 usually moves relatively (such as rotation or slide) to the second substrate 22 with the direction parallel to the first plane (or the second plane) to change the overlap relationship between these input holes (23/24/25) and these microfluidics channels. As to how to control some relative motion between substrate 21 and substrate 22 is a prior art, and how to use a computer to control a stepping motor, screws, and a fixed flat plane etc . . . will not be detailed here.

Figures 2D, 2E:
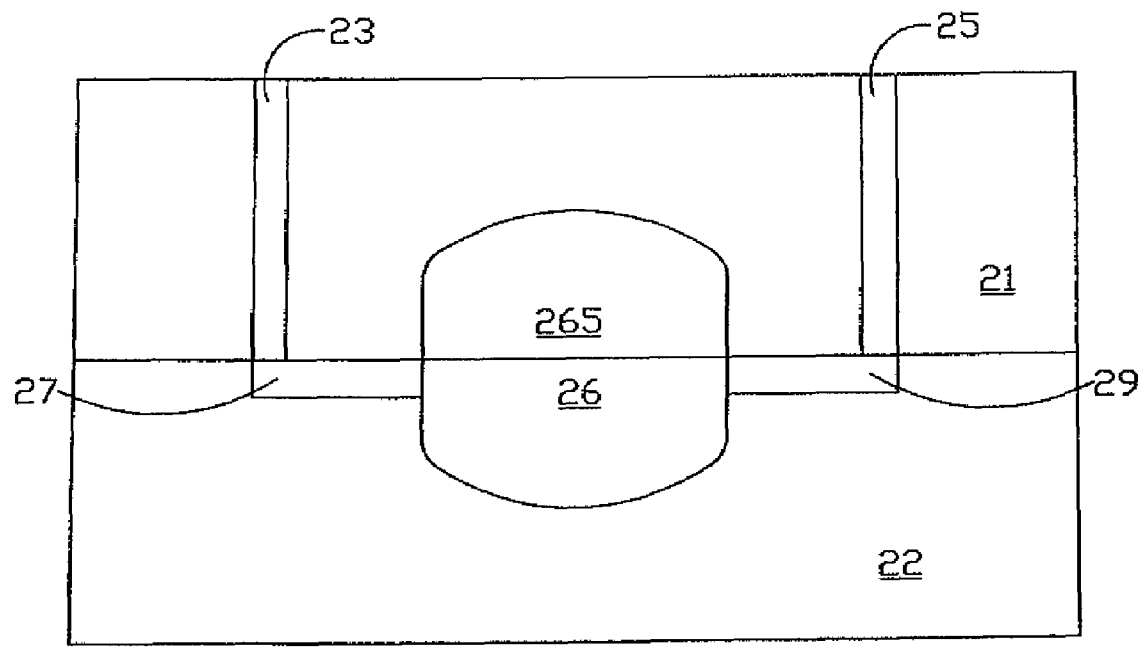

Besides, take FIG. 2D for example, one further change of the embodiment is to comprise the assistant pit 265 on the first substrate. While the first substrate is closely neighbored on the second substrate, the assistant pit 265 will communicate with the pit 26. Obviously, the reaction chamber at this time is composed of the assistant pit 265 on the first substrate and the pit 26 on the second substrate, and it is not composed of only the pit 26 on the second substrate. Therefore, the thickness of the second substrate can be shortened and the thickness of the whole microfluidics switch with moving planes will further be shortened.

Of course, in order to stop the flow and mixing of fluids between the two substrates 21/22, the first plane can be closely neighbored the second plane in the embodiment (such as a passive microfluidics switch in the prior art). Besides, the embodiment can also be practiced with a distance between the two planes smaller than any height of the drop formed by the first fluid passing through the first hole 23 or the second fluid passing through the second hole 24 separately. As for why the mixing of fluids can be stopped in this way can be referred to the experimental data shown in FIG.2E. While Teflon is used as the hydrophobic material, the contact angle formed by PMMA (polymethylmethacrylate) and the fluid drops (15.3 µl) of the same size of deionized water and RPMI 1640 will become bigger, the height of fluid drops will become higher, and further the fluid drops with the big angle will not be able to pass through the vacancy formed between the first substrate and the second substrate, the vacancy which can be passed through by fluid drops with a small contact angle (This is because the limitation of the surface tension, a drop of a fluid has a smallest volume that cannot be separated). Of course, the hydrophobic material may not be Teflon necessarily, and any material that can let the contact angle between any fluid and the hydrophobic material be greater than 90 degrees is a hydrophobic material can be used in the embodiment. That is to say, different fluids needed to be switched can use different hydrophobic materials in the embodiment.

Figure 2F:
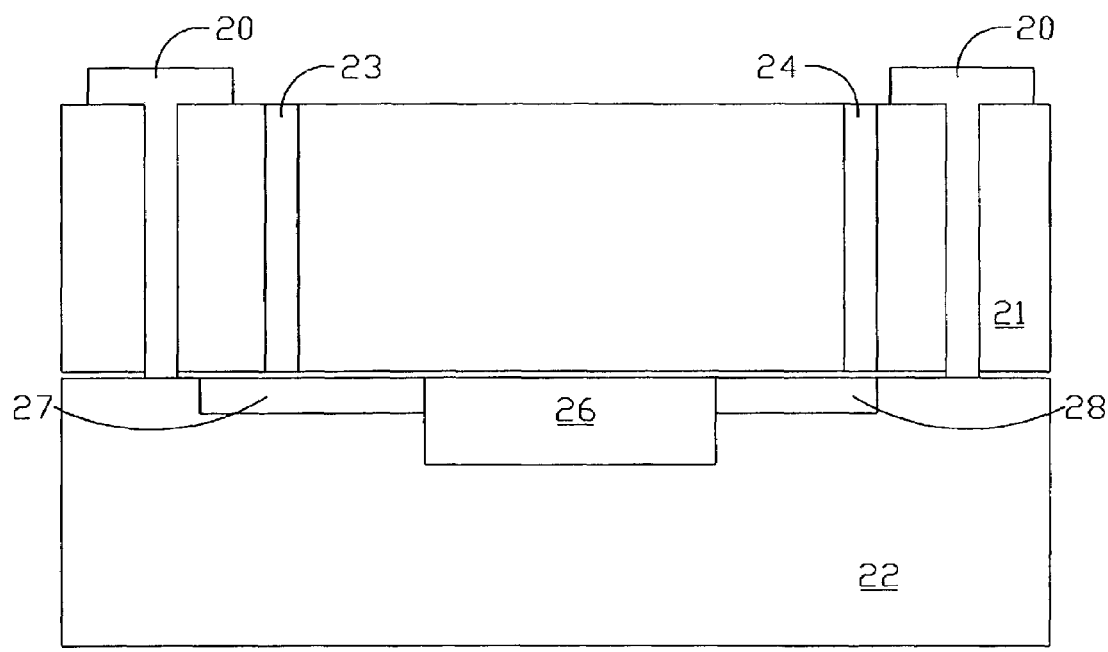
Figure 3A:
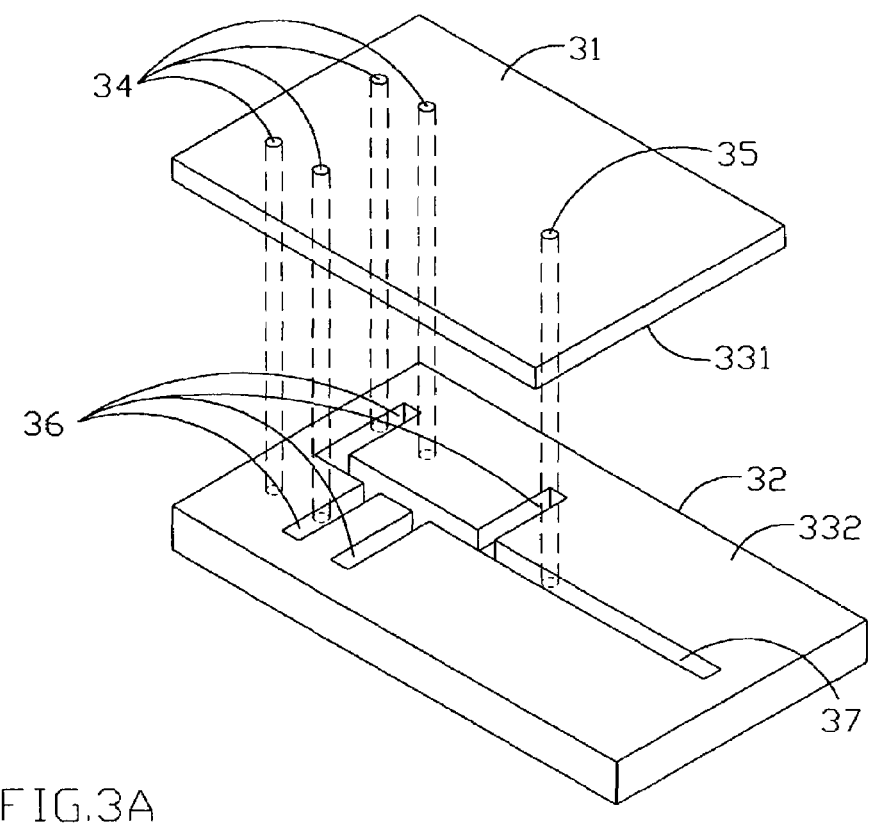
FIG. 3A to FIG. 3D are the schematics of the fundamental constitution of another kind of microfluidics switch with moving planes of the invention.
Figure 3B:
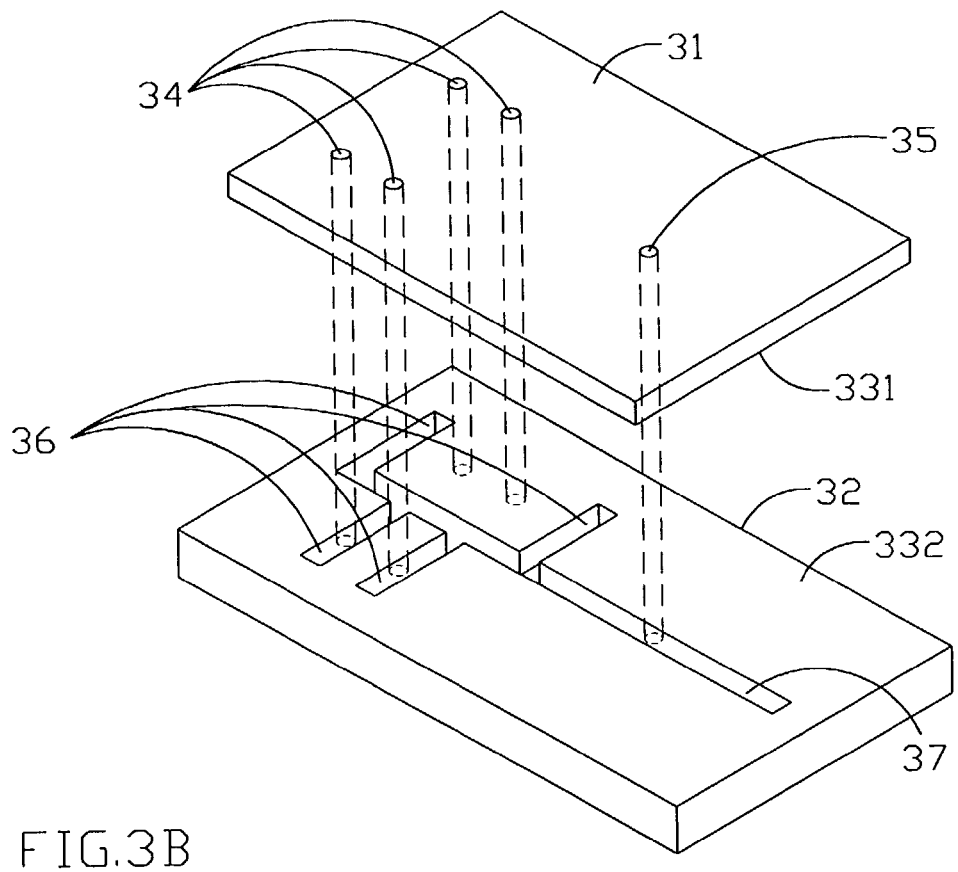
Figure 3C:
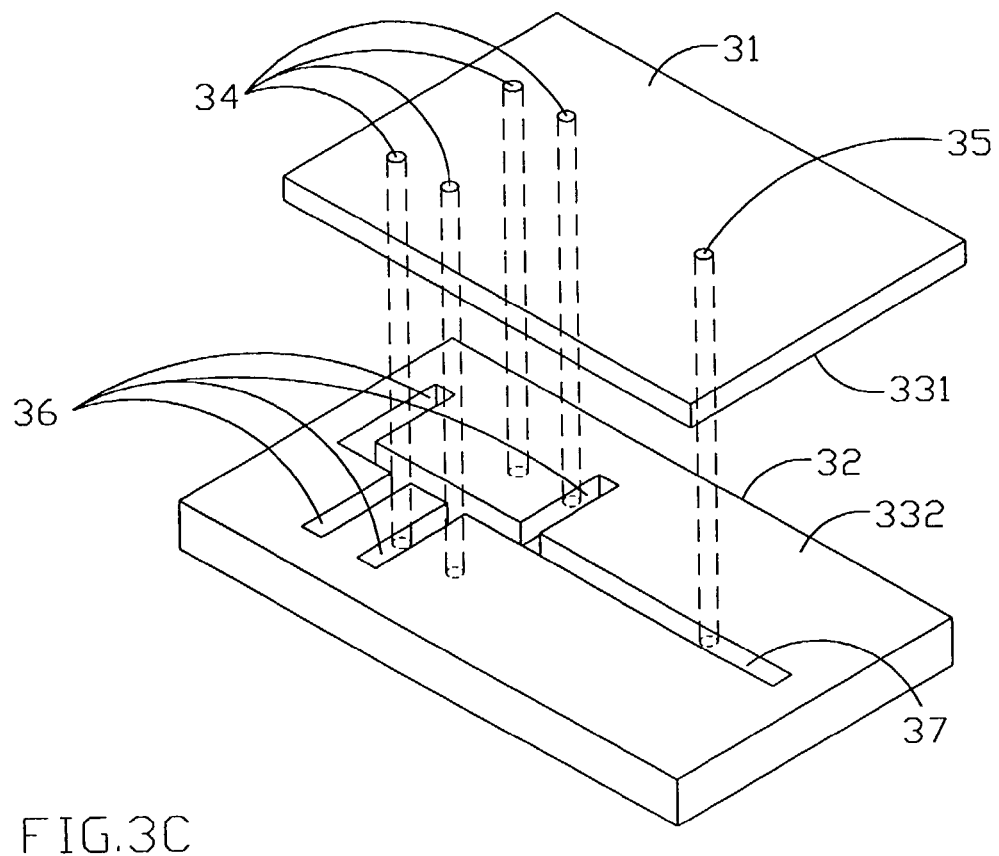
Figure 3D:
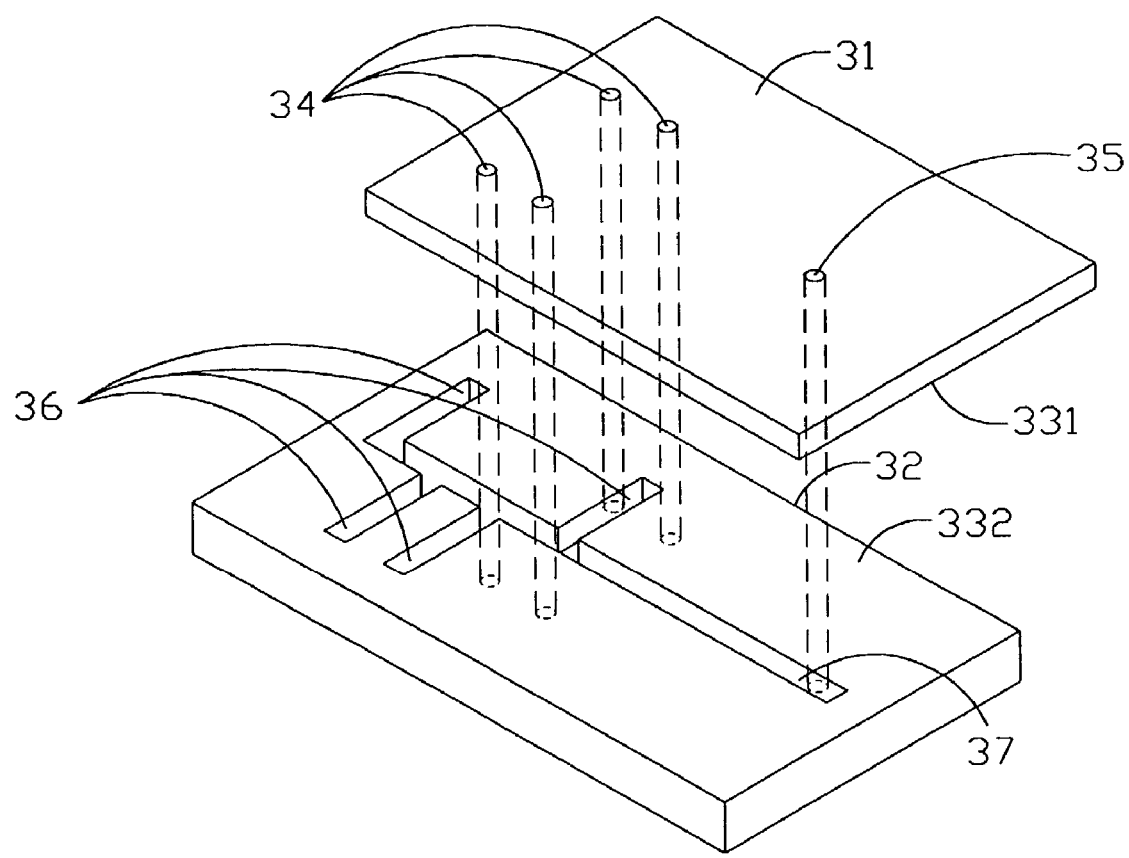

Of course, if the requirement of stopping fluid passing through the vacancy formed between the first substrate 21 and the second substrate 22 can be satisfied, the distance between the first plane (or the hydrophobic material covered on the first plane) and the second plane (or the hydrophobic material covered on the second plane) can be adjusted. For example, as shown in FIG. 2F, let the first substrate 21 have at least one pin for pressing 20 to change the distance between the first substrate and the second substrate. Of course, the pin for pressing 20 can also be set on the second substrate 22. Of course, the pin for pressing 20 can also be only used to fix the relative distance between the first substrate and the second substrate while composing the microfluidics switch with moving planes.

Further, the flow of fluids in micro-fabricated channels can be applied to not only the bio-chemical experiment but also the thermal ink-jet printer. Therefore the basic characteristics of the invention should only include "the relative motion between two substrates", "fluid passage composed by micro-holes and microfluidics channels", and "using hydrophobic materials". The invention does not necessarily need the pit and the assistant pit that are used as a reaction chamber. Besides, the fully-conducted passages are switched by the relative motion between the two substrates in the invention, and no modification is necessary in any holes and microfluidics channels. Therefore switch between two fluid passage (two fluids) is not only always the case. Besides, the invention only needs hydrophobic materials used on the relative planes, but it does not need the detailed description of limiting what kinds of these hydrophobic materials and the detailed description of the formation of these materials.

Therefore, another preferred embodiment of the invention is a microfluidics switch with moving planes as shown in FIG. 3A FIG. 3B FIG. 3C and FIG. 3D, comprising a first substrate 31 and a second substrate 32. Herein, it neglects all details unrelated to the embodiment to simplify schematics and texts, such as the tubes to connect outside and the means to move substrates 31/32. For easy illustration, the distance between the first substrate 31 and the substrate 32 is exaggeratedly drawn, but the actual distance is very small.

The first substrate 31 has the first plane covered by the first hydrophobic material 331, and the first plane has many independent input holes 34 and at least one output hole 35. The second substrate 32 is close to the first substrate 31 and has the second plane covered by the second hydrophobic material 332, the plane that is relative to the first plane. The second plane has many input microfluidics channels 36 and at least one output microfluidics channel 37. Herein, the distribution and shape of these input holes 34, output holes 35, input microfluidics channels 36, and output microfluidics channels 37 will be that while at least one input hole 34 overlaps at least one input microfluidics channel, the output hole 35 will also overlap the output microfluidics channel 37, and then a fully-conducted fluid channel will be formed inside the microfluidics switch with moving planes.

In the embodiment, the first substrate 31 can move relatively to the second substrate 32 in the direction parallel with the first plane or the second plane to change the overlap relationship between input holes 34 and input microfluidics channels 36. Besides, the first hydrophobic material and the second hydrophobic material could be Teflon or any other material that will let the contact angle between the fluids passing through input holes 34 and the first hydrophobic material 331 or the second hydrophobic material 332 bigger than 90 degrees.

Of course, FIG. 3A to FIG. 3D is only an example used to illustrate that the combinations between the different input holes 34 receiving different fluids from outside and the input microfluidics channels 36 or output microfluidics channels 37 can be controlled through the relative motion between the first substrate 31 and the second substrate 32. Of course, as the number of both input holes 34 and input microfluidics channels 37 increases and the distribution gets more complicated, the number of the combinations can be controlled by the embodiment will be unlimited.

Of course, the embodiment can optionally comprise at least one pit on the second plane and let the pit be communicated with both these input microfluidics channels 36 and output microfluidics channels 37. Herein, the pit can be used as a reaction chamber, only a component of fluid channels, and a buffer for switching different fluids. In the meantime, the embodiment can also comprise at least one assistant pit on the first plane as the last embodiment can do. While the first substrate 31 connects with the second substrate 32, any assistant pit will communicate with the pit, the input microfluidics channels 36, and the output microfluidics channels 37.

Of course, because the embodiment here applies hydrophobic materials to separate different input holes 34 from different input microfluidics channels completely, the distance between the first hydrophobic material 331 and the second hydrophobic material 332 is adjustable in the embodiment. In the embodiment, while there is more than one fluid passing through the microfluidics switch with moving planes, the distance between the first hydrophobic material and the second hydrophobic material can be smaller than any drop formed by any fluid on the hydrophobic materials 331/332. In the embodiment, either the first substrate 31 has at least one pin for pressing to change the distance between the first substrate 31 and the second substrate 32 or the second substrate 32 has at least one pin for pressing to change the distance between the first substrate 31 and the second substrate 32.

What is said above is only a preferred embodiment of the invention, which is not to be used to limit the claims of the invention; any change of equal effect or modifications that do not depart from the essence displayed by the invention should be limited in what is claimed in the following.

The invention claimed is:

1. A microfluidics switch with moving planes, comprising:
   a first substrate having a first hydrophobic plane, said first hydrophobic plane having a plurality of input holes and at least one output hole passing through said first substrate, said plurality of input holes and said at least one output hole being isolated from each other, wherein said plurality of input holes comprise a first hole, a second hole, and a third hole; and
   a second substrate having a second hydrophobic plane, said second hydrophobic plane having a pit for reaction, a plurality of input microfluidics channels, and at least one output microfluidics channel, said plurality of input microfluidics channels and said at least one output microfluidics channel connecting with said pit;
   wherein said first hydrophobic plane of said first substrate is faced to and sliding contact with said second hydrophobic plane of said second substrate, said first substrate is capable of moving parallel to said second hydrophobic plane of said second substrate to a first relative position or a second relative position so as to control the overlap relationship between said plurality of holes and said plurality of microfluidics channels, a fluid channel is formed while at least one of said plurality of input holes is overlapped with at least one of said plurality of input microfluidics channels and at least one of said at least one output hole is overlapped with at least one of said at least one output microfluidics channel, wherein said first hole is communicated with said pit, said second hole is not communicated with said pit, and said third hole is communicated with said pit in said first relative position, and wherein said first hole is not communicated with said pit, said second hole is communicated with said pit, and said third hole is communicated with said pit in said second relative position.

2. The microfluidics switch with moving planes according to claim 1, further comprising an assistant pit on said first hydrophobic plane, said assistant pit is communicated with said pit when said first substrate is juxtaposed said second substrate.

3. The microfluidics switch with moving planes according to claim 1, wherein said first hydrophobic plane is slidable along said second hydrophobic plane.

4. The microfluidics switch with moving planes according to claim 1, at least one fluid flows through said microfluidics switch with moving planes.

5. A microfluidics switch with moving planes, comprising:
   a first substrate having a first hydrophobic plane, said first hydrophobic plane having a plurality of input holes and at least one output hole passing through said first substrate, said plurality of input holes and said at least one output hole being isolated from each other, wherein said plurality of input holes comprise a first hole, a second hole, and a third hole;
   a second substrate having a second hydrophobic plane, said second hydrophobic plane having a pit for reaction, a plurality of input microfluidics channels, and at least one output microfluidics channel, said plurality of input microfluidics channels and said at least one output microfluidics channel connecting with said pit; and
   at least one pin, said at least one pin having a sliding contact with said first hydrophobic plane or said second hydrophobic plane for adjusting a distance between said first substrate and said second substrate;
   wherein said first hydrophobic plane of said first substrate is faced to and is slidable along said second hydrophobic plane of said second substrate, said first substrate is capable of moving parallel to said second hydrophobic plane of said second substrate to a first relative position or a second relative position so as to control the overlap relationship between said plurality of holes and said plurality of microfluidics channels, a fluid channel is formed while at least one of said plurality of input holes is overlapped with at least one of said plurality of input microfluidics channels and at least one of said at least one output hole is overlapped with at least one of said at least one output microfluidics channel, wherein said first hole is communicated with said pit, said second hole is not communicated with said pit, and said third hole is communicated with said pit in said first relative position, and wherein said first hole is not communicated with said pit, said second hole is communicated with said pit, and said third hole is communicated with said pit in said second relative position.

6. The microfluidics switch with moving planes according to claim 5, further comprising at least one pin for pressing on said first substrate to change said distance between said first substrate and said second substrate.

7. The microfluidics switch with moving planes according to claim 5, further comprising at least one pin for pressing on said second substrate to change said distance between said first substrate and said second substrate.

8. The microfluidics switch with moving planes according to claim 1, wherein said first hydrophobic plane and said second hydrophobic plane are formed of a hydrophobic material chosen from the group consisting of the following materials: Teflon® and any material which let contact angle formed between any fluid and said hydrophobic material be bigger than 90 degrees.

9. The microfluidics switch with moving planes according to claim 1, wherein said first substrate can be moved parallel to said second hydrophobic plane of said second substrate by rotation or sliding.

* * * * *